United States Patent [19]

Francis et al.

[11] Patent Number: 4,517,037

[45] Date of Patent: May 14, 1985

[54] REFRACTORY COMPOSITION COMPRISING NITRIDE FILLER AND COLLOIDAL SOL BINDER

[75] Inventors: Thomas L. Francis, Murrysville; Frankie E. Phelps, Lower Burrell, both of Pa.

[73] Assignee: Aluminum Company of America, Pittsburgh, Pa.

[21] Appl. No.: 589,138

[22] Filed: Mar. 13, 1984

Related U.S. Application Data

[63] Continuation-in-part of Ser. No. 316,810, Nov. 2, 1981, abandoned.

[51] Int. Cl.$^3$ ............................................. C04B 35/58
[52] U.S. Cl. ................................. 156/89; 204/243 R; 204/67; 501/96; 501/97; 501/98; 501/128; 501/133; 501/154
[58] Field of Search ...................... 156/89; 501/96, 97, 501/98, 133, 128, 154; 423/DIG. 12, 327

[56] References Cited

U.S. PATENT DOCUMENTS

| | | | |
|---|---|---|---|
| 3,785,941 | 1/1974 | Jacobs | 501/97 |
| 3,971,665 | 7/1976 | Suzuki et al. | 501/123 |
| 3,991,166 | 11/1976 | Jack et al. | 501/98 |
| 4,039,647 | 8/1977 | Wohleber et al. | 423/DIG. 12 |
| 4,069,057 | 1/1978 | Kamei et al. | 501/133 |
| 4,069,058 | 1/1978 | Washburn | 501/133 |
| 4,218,254 | 8/1980 | Kiehl et al. | 501/97 |
| 4,243,621 | 1/1981 | Mori et al. | 501/98 |

*Primary Examiner*—Helen M. McCarthy
*Attorney, Agent, or Firm*—Glenn E. Klepac

[57] ABSTRACT

A refractory composition having a high resistance to corrosion by molten metal chlorides and chlorine gas at elevated temperatures. The composition comprises about 100 parts by weight of a nitride refractory filler, a suitable quantity of a colloidal sol binder and less than about 4 parts by weight of the oxides or hydroxides of magnesium, calcium, chromium and manganese.

17 Claims, No Drawings

REFRACTORY COMPOSITION COMPRISING NITRIDE FILLER AND COLLOIDAL SOL BINDER

REFERENCE TO RELATED APPLICATIONS

This application is a continuation-in-part of U.S. Ser. No. 316,810, filed Nov. 2, 1981, now abandoned.

BACKGROUND OF THE INVENTION

This invention relates to refractory compositions suitable for use as mortar.

By the nature of its use, a refractory mortar must exhibit good refractoriness, be susceptible to application by troweling, and have good bonding and adhesive characteristics. In addition to the aforementioned qualities, there are many applications or fields of use that require a refractory mortar to demonstrate corrosion resistance in a hostile environment such as a steel-making furnace, copper-producing furnace, or a cell for producing aluminum by electrolysis from molten salts. In applications of this kind, the mortar must be resistant to attack from the corrosive effect of a wide variety of molten salts, slags, metals, gases and vapors emanating from the molten baths, and slag residues that result as by-products from the metal-producing process.

For example, in an electrolytic process for producing aluminum, aluminum chloride is dissolved in a molten salt of higher decomposition potential as described in U.S. Pat. No. 3,822,195. The resultant salt bath is contained in an electrolytic cell and by passing current through the cell, the aluminum chloride is decomposed, liberating the chlorine as a gas and collecting the molten aluminum in the bottom of the cell. Typically, at least a portion of the cell is lined with refractory bricks or shapes known to have good corrosion resistance in the hostile environment generated in the cell. Nitride refractories, such as silicon oxynitrides, silicon nitride or compositions of silicon aluminum oxynitride having aluminum and oxygen in solid solution in silicon nitride, hereinafter referred to as SiAlON, provide the necessary refractoriness and corrosion resistance for such a use. Heretofore, no mortar has been known to bond the bricks or shapes together, and thus there has been a continuing problem of containing the molten salt, molten metal, gases and vapors in the cell without penetration through the seams between abutting bricks or shapes.

It is desirable, therefore, to provide a mortar for bonding refractory shapes or bricks together that is capable of resisting corrosive attack in a hostile environment, such as, for example, the environment within an electrolytic cell for producing aluminum from aluminum chloride.

SUMMARY OF THE INVENTION

It has now been found, according to this invention, that a composition for a mortar having good corrosion resistance and refractory properties includes a nitride refractory filler and colloidal sol binder material.

As used herein the term nitride refractory means a refractory containing at least one atomic percent nitrogen, preferably at least 10 atomic percent nitrogen, more preferably at least 20 atomic percent nitrogen, associated with, for example, as a mixture or in compound or combined or solid solution form, silicon, aluminum, beryllium, magnesium, titanium, chromium, hafnium, manganese, iron, scandium, yttrium, zirconium, the rare earth elements and the like. Oxygen may also be present. Such refractories include, for example, silicon nitride, silicon oxynitride, aluminum oxynitride, aluminum nitride and silicon aluminum oxynitride wherein the aluminum and oxygen are in a solid solution of silicon nitride (SiAlON). SiAlON is an acronym for material found in the Si-Al-O-N system and more specifically in the $Si_3N_4$-$AlN$-$Al_2O_3$-$SiO_2$ system. Rather than a single compound, the word SiAlON represents the compositions found in this system. As one example, Jack et al. U.S. Pat. No. 3,991,166 describes a single phase SiAlON material and method of making it having the general formula $Si_{6-z}Al_zO_zN_{8-z}$ where z is greater than zero and less than or equal to five. The various compositions which result from making SiAlON within the bounds of the general formula have a crystalline structure similar to beta-$Si_3N_4$ and are consequently identified as beta'-SiAlON. Preferred are nitride refractories that are compounds or solid solutions as contrasted with heterogeneous mixtures such as silicon nitride-bonded alumina.

Up to about 20 wt.% boron nitride may optionally be added to the filler. Addition of boron nitride makes the refractory composition non-wetting with respect to certain molten metals, such as aluminum.

Concerning the colloidal sol binder material, its composition may vary substantially. Suitable examples are colloidal silica, colloidal alumina, colloidal silicon aluminum oxynitride, colloidal silicon nitride, colloidal silicon oxynitride, colloidal aluminum nitride and colloidal boron nitride. A mortar of this invention is trowelable, and air dries to provide a mechanical bond of adequate strength in a green or unfired condition. After air drying, the mortar is fired at an elevated temperature to improve its mechanical properties. It is believed that the improved mechanical properties are a result of a chemical reaction of the colloidal binder with the nitride filler. It is an advantage of this invention that the temperature required to improve mechanical properties is substantially lower than the typical reactant temperature for the particular colloidal binder material being utilized. For example, silica is typically nonreactive at temperatures below 800° C., but in the practice of this invention using silica sol as a binder, the mortar attains improved mechanical properties at a temperature of about 700° to 800° C. It is believed that the colloidal binder is reactive at lower temperatures than would typically be required because of its extremely small particle size. Although the firing temperature required may vary somewhat depending on the particular colloidal sol binder being used, the firing temperature will be lower than that generally considered necessary.

The binder is added in a quantity that is sufficient to coat substantially all of the filler and to form a plastic mixture when mixed with the filler. The term "plastic mixture" refers to a mixture that is capable of being spread with a trowel or molded. The quantity of colloidal sol binder generally ranges from about 10 to 100 parts by weight, based on 100 parts by weight of the filler. Compositions are preferred containing about 30 to 75 parts by weight colloidal sol binder.

The refractory composition of the invention comprises less than about 4 parts by weight of the oxides or hydroxides of magnesium, calcium, chromium and manganese, preferably less than about 2 parts by weight. These oxides and hydroxides are optimally maintained in as low a concentration as possible in order to enhance resistance of the composition to corrosion at elevated temperatures.

In addition to its use as a mortar, a refractory of this invention may be supplied to the interior surfaces of a furnace or electrolytic cell, for example, to form a monolithic refractory liner.

Thus, it will be seen that an object of this invention is to provide a composition of matter that may be used in the form of a refractory mortar for use in a hostile corrosive environment.

It is a further object of this invention to provide a composition of matter that may be used to produce a monolithic refractory lining for furnaces, cells and the like wherein hostile corrosive environments are generated.

DESCRIPTION OF THE PREFERRED EMBODIMENTS

A preferred refractory composition of this invention comprises a nitride refractory filler of silicon nitride, silicon oxynitride, beta'-SiAlON or combinations thereof and a colloidal sol binder material.

The particle size of the filler may vary over a broad range depending upon particular desired characteristics of the mortar. Larger particle sizes provide a mortar with better shrinkage properties and a better resistance to the effects of thermal shock, for example, than a mortar comprised of small sized particles. Larger particle sizes, on the other hand, produce a more porous structure in the mortar upon firing and make the resultant refractory less resistant to penetration from the elements of the hostile environment than if the mortar is comprised of small sized particles.

A preferred colloidal sol binder material is colloidal silica. Such is generally supplied in water-suspensions in various concentrations of $SiO_2$ ranging up to about 50 wt.% solids. A preferred water suspension has a 40 wt.% $SiO_2$ concentration. The amount of colloidal sol binder is chosen such that it is effective for binding essentially all of the nitride refractory filler particles together into a plastic mixture. As used herein, the term "plastic mixture" refers to a mixture that is capable of being spread with a trowel or molded.

In general, the amount of binder required is a function of surface area of the filler particles. The amount of colloidal sol binder material can be determined without undue experimentation, by varying the amount of binder in relation to the filler materials and exposing test specimens made from the various compositions to the particular environment with which the user is concerned. After exposure, the test specimens may be observed visually for evidence of corrosive attack, mechanical failure such as cracking, or subjected to a boiling water test as a measure of adhesion characteristics. The above-mentioned experimentation process is described in greater detail hereafter for testing refractory compositions of this invention in a molten chloride salt environment generated in a process for making aluminum.

In preparing sample mortar mixture for testing, filler material was crushed and then ground to pass through a 48 mesh screen (Tyler Series). A typical particle size distribution of the resultant crushed and ground filler material is as follows:

| Screen Size (mesh) | Amount (wt. %) |
|---|---|
| −48 +65 | 26.3 |
| −65 +100 | 19.1 |
| −100 +200 | 23.5 |
| −200 +325 | 15.9 |
| −325 | 15.2 |

A particle size of less than 48 mesh is preferred in order to provide a mortar that is relatively nonporous after firing when installed in the particular testing environment described below.

An additional amount of filler material may be provided in a superground powder form, i.e. particle size of less than 325 mesh, with as much as 99 wt.% below 400 mesh. Such superground component was provided, for example, by ball milling for 16 hours a portion of the aforementioned ground material in a ceramic mill of 4.3 liters capacity operating at 70 rpm. The milling media was 99% alumina balls and 0.5% ethylene glycol by weight of material to be ground. The superground powder having a typical median particle size of about 2.1 microns may be provided to fill voids between the −48 mesh material particles and to increase the surface or bonding area of the filler material.

The mortar composition may further include fumed silica to provide an intermediate particle in spaces between the nitride refractory filler particles. Fumed silica is silicon dioxide having a particle size range of 0.01–0.40 microns. It is additionally characterized as being a spherical shaped amorphous silica. In a series of examples, the ground and superground filler materials as described above were dry blended with fumed silica. The resultant blended materials were then mixed with a colloidal sol silica binder. Table 1 lists the compositions of mortar mixes prepared for subsequent testing.

TABLE 1

| | | Composition (% dry weight) | | | | |
|---|---|---|---|---|---|---|
| Example | Filler Type | −48 Mesh Aggregate | Superground Powder | Fumed Silica | Colloidal[2] Silica Binder (wt. % of dry weight material) | Bonded Brick |
| 1 | SiAlON[1] | 87.7 | 8.77 | 3.51 | 42.6 | Varnon BF[3] |
| 2 | SiAlON[1] | 80.6 | 16.1 | 3.22 | 48.4 | Varnon BF |
| 3 | SiAlON[1] | 80.6 | 16.1 | 3.22 | 42.2 | SiOXYN[4] |
| 4 | $Si_2ON_2$ | 80.6 | 16.1 | 3.22 | 42.5 | Varnon BF |
| 5 | $Si_2ON_2$ | 80.6 | 16.1 | 3.22 | 42.5 | SiOXYN |

TABLE 1-continued

| | | | Composition (% dry weight) | | | |
|---|---|---|---|---|---|---|
| Example | Filler Type | −48 Mesh Aggregate | Super-ground Powder | Fumed Silica | Colloidal[2] Silica Binder (wt. % of dry weight material) | Bonded Brick |
| 6 | $Si_2ON_2$ | 80.6 | 16.1 | 3.22 | 42.5 | SiOXYN |

Notes:
[1]SiAlON is an acronym for silicon aluminum oxynitride wherein aluminum and oxygen are in solid solution in a silicon nitride matrix.
[2]In Examples 1-5, the colloidal silica binder material bore the trademark Ludox, of the DuPont Co., Wilmington, Delaware 19898, and had a 40 wt % $SiO_2$ concentration. Example 6 was prepared using Synar brand colloidal silica of 40 wt. % $SiO_2$ concentration, made by Penwalt Corp. of Philadelphia, Pennsylvania.
[3]Varnon BF is a trademark for a superduty fireclay brick made by Harbison-Walker, Pittsburgh, Pennsylvania.
[4]SiOXYN is a trade name for an $Si_2ON_2$ brick made by Norton Co., Worcester, Massachusetts.

The examples as indicated in Table 1 were blended and mixed to form a mixture of a plastic consistency suitable for applying to a brick or shaping with a trowel. It was observed that the wet mix retained suitable plasticity for troweling for a period of 20 to 30 minutes.

The mortar mix, prepared as just described, was then applied as a ⅛ to 1/16 inch thick layer on the refractory bricks indicated in Table 1, and mortared bricks were then combined in an assembly having the mortar mix as a seam or joint between the bricks. The mortared brick assemblies were allowed to air dry at room temperature overnight and were then fired in a muffle furnace at temperatures of 700°-800° for periods of time up to 15 minutes to convert the mortar and brick to a finished refractory assembly.

Testing of preferred embodiments of a mortar of the subject invention was conducted in the hostile environments generated by an electrolytic process of producing aluminum from aluminum chloride and producing aluminum chloride in a molten salt reactor. It is not intended that the use of this refractory be limited to the environments described, nor that a refractory of this invention be limited by failures of certain compositions to pass the boiling water test described herein. It is apparent that compositions that were considered to be unsatisfactory or marginal for use in the particular hostile environment described for testing the examples of this specification would have utility in a different or less hostile environment without departing from the spirit of the invention.

To evaluate the suitability of a mortar of this invention for use in an electrolytic process for producing aluminum, the mortared brick assemblies after firing were tested in a bench scale electrolytic cell that was operated to duplicate the hostile environment in a production cell. The cell contained a molten salt bath comprising approximately 57 wt.% sodium chloride, 38 wt.% lithium chloride and 5 wt.% aluminum chloride. In operating the cell, the bath was maintained at a temperature of approximately 710° C., and direct electrical current of 60 amps was passed through the bath on a continuous basis to cause decomposition of the aluminum chloride. Molten aluminum is collected in the bottom of the cell and chlorine gas is liberated at an anode that is suspended within the bath.

The mortared samples were disposed in the operating cell for a period of one month in such a manner that the mortar was exposed to molten bath, molten aluminum, chlorine, and vapors and gases emanating from the molten bath. During operation of the cell, the bath was kept in motion within the cell by bubbling chlorine therethrough. After one month exposure in this hostile environment, the samples were removed from the bath, and from a visual inspection of mortar compositions of Examples 1-6, there was no evidence of attack on the mortar.

Following removal from the test cell, the mortared brick assemblies were further tested for molten salt retention by immersion in boiling distilled water for 12 hours. During the test, the water was changed frequently to maintain its essentially distilled characteristic. None of the Examples 1-6, Table 1, gave any evidence of bond or adhesion failure after being subjected to the boiling water test.

Additional samples were prepared varying the ratio of superground powdered filler material to the −48 mesh filler aggregate. In these samples, the colloidal silica binder material was supplied at approximately 43 wt.% of the total mortar dry components. It was found that the superground powder can range up to approximately 50% of the total available refractory filler material without having a detrimental effect on corrosion resistance or adhesiveness of the mortar. At a higher level of superground filler powder composition (80% of the total available refractory filler material), a test sample subjected to the boiling water test began to show evidence of adhesion failure; that is, a separation between the mortar and the brick. This phenomenon suggests that the increase in surface area of the filler material generated by the introduction of larger amounts of superground powder makes the 43% colloidal silica sol binder constituent inadequate to completely coat all of the filler material and thus affects the adhesive properties of the material. Concentrations of superground powder in excess of 50 wt.% of total available refractory filler material can be utilized, however, by making adjustments in the colloidal silica sol binder content of the mix to insure that substantially all of the filler material particles are completely coated.

Other samples were prepared and tested varying the amount of colloidal silica sol binder. Samples were prepared using a refractory filler material content of 50% particle sizes smaller than 48 mesh and 50% superground powder and 3.2 wt.% of the dry materials of fumed silica. To this dry mixture, one sample was prepared having a colloidal silica sol binder content of 43 wt.% of the dry mixture, and another sample was prepared having a colloidal silica sol binder content of 30 wt.% of the dry mixture. After blending, the mortar was applied to refractory bricks, air dried and the assemblies fired in a manner as has been previously described.

The samples were then exposed in an electrolytic cell for a period of 30 days as previously described. After removal from the cell, neither sample displayed evidence of corrosive attack nor a bond or adhesion failure. In a subsequent boiling water immersion test, however, the sample having the 30% binder content displayed evidence of adhesion failure; that is, separation between the mortar and the brick. This observation suggests that failure resulted because of an insufficiency of colloidal silica sol binder to completely coat the filler particles. It is to be noted that indications of adhesion failure in the boiling water tests just described are a measure of relative merit of the particular mixes for service in the particular electrolytic, molten salt environment. It is clear that all the specimens we found to fail in the boiling water immersion test could be suitable for use in other less hostile refractory applications.

Additional tests in a hostile environment different from the electrolytic cell environment just discussed were performed on refractory bricks assembled with a refractory mortar of this invention having a composition of Examples 3 and 4, as shown in Table 1. In these tests, the refractory assemblies were exposed in a reactor used to produce $AlCl_3$ by a process similar to that described in U.S. Pat. No. 4,039,647. Making $AlCl_3$ in accordance with this patent involves contacting aluminum oxide, a reducing agent, and a source of chlorine in a molten bath of aluminum chloride and metal halide to form aluminum chloride which is recovered from the bath by vaporization. The molten salt bath was contained within a reactor vessel under 80 psia pressure and maintained at a temperature of approximately 800° C. It may be seen that an extremely hostile environment is created within the reactor vessel. In testing a refractory mortar of the subject invention, the molten salt bath included 30% NaCl and 70% $AlCl_3$ saturated with $Al_2O_3$. Ground coke was used as the reducing agent and phosgene ($COCl_2$) was introduced as the source for chlorine. Refractory bricks were assembled with refractory mortars of the compositions of Examples 3 and 4 in Table 1 in a manner similar to that described in preparing assemblies for testing in the electrolytic cell, and were submerged in the salt bath in the vessel so as to be exposed to the molten salt bath containing alumina, phosgene, chlorine and carbon plus carbon oxides. After exposure for a period of 8 days, the sample assemblies were removed from the vessel and there was no visual evidence of corrosion or failure in bonding or adhesion of the mortar.

What is claimed is:

1. A refractory composition having high resistance to corrosion by molten metal chlorides and chlorine gas at elevated temperatures, said composition comprising
   (a) about 100 parts by weight of a nitride refractory filler selected from the group consisting of nitrides of silicon, aluminum, titanium, chromium, hafnium, zirconium, beryllium, magnesium, manganese, iron, scandium, yttrium and rare earth elements; silicon oxynitride; aluminum oxynitride; and silicon aluminum oxynitride wherein the aluminum and oxygen are in a solid solution of silicon nitride;
   (b) about 30 to 100 parts by weight of a colloidal sol binder selected from the group consisting of silica, silicon aluminum oxynitride wherein the aluminum and oxygen are in a solid solution of silicon nitride, silicon oxynitride, silicon nitride, aluminum nitride, boron nitride and alumina, all in colloidal sol form, said binder comprising an aqueous suspension containing up to about 50 wt.% solids, the quantity of binder and the concentration of binder solids being sufficient to coat substantially all of the filler and to form a plastic mixture with the filler; and
   (c) less than about 2 parts by weight of the oxides or hydroxides of magnesium, calcium, chromium and manganese.

2. The refractory composition of claim 1 wherein said binder comprises an aqueous suspension of silica.

3. The refractory composition of claim 2 wherein said binder comprises about 40 wt.% silica.

4. The refractory composition of claim 1 comprising about 30 to 75 parts by weight colloidal sol binder, based on the weight of the filler.

5. The refractory composition of claim 1 wherein said filler comprises silicon oxynitride or silicon aluminum oxynitride wherein the aluminum and oxygen are in a solid solution of silicon nitride.

6. The refractory composition of claim 1 further comprising:
   (d) about 0.1 to 25 parts by weight of fumed silica.

7. The refractory composition of claim 1 wherein said filler is in particulate form and substantially all of said particulate filler passes through a 48 mesh screen (Tyler Series).

8. The refractory composition of claim 7 wherein at least 50 wt.% of said particular filler passes through a 100 mesh screen (Tyler Series).

9. The refractory composition of claim 7 wherein at least 20 wt.% of said particulate filler is retained by a 400 mesh screen (Tyler Series).

10. The refractory composition of claim 7 wherein at least 50 wt.% of said particulate filler is retained by a 400 mesh screen (Tyler Series).

11. The refractory composition of claim 1 wherein the nitrogen content of said filler is at least 10 atomic percent.

12. The refractory composition of claim 1 wherein the nitrogen content of said filler is at least 20 atomic percent.

13. The refractory composition of claim 1 wherein said filler comprises silicon oxynitride or silicon aluminum oxynitride wherein the aluminum and oxygen are in a solid solution of silicon nitride and said binder comprises a colloidal silica sol.

14. A method for joining refractory bricks comprising the steps of:
   (a) preparing a mortar mix comprising:
      (i) about 100 parts by weight of a particulate nitride refractory filler selected from the group consisting of nitrides of silicon, aluminum, titanium, chromium, hafnium, zirconium, beryllium, magnesium, manganese, iron, scandium, yttrium and rare earth elements; silicon oxynitride; aluminum oxynitride and silicon aluminum oxynitride wherein the aluminum and oxygen are in a solid solution of silicon nitride, substantially all of said particulate filler passing through a 48 mesh screen (Tyler Series);
      (ii) about 30 to 100 parts by weight, based on the weight of the filler, of a colloidal sol binder and the concentration of binder solids selected from the group consisting of silica, silicon aluminum oxynitride. wherein the aluminum and oxygen are in a solid solution of silicon nitride, silicon nitride, silicon oxynitride, aluminum nitride, boron nitride and alumina, all in colloidal sol form, said binder comprising an aqueous suspension containing up to about 50 wt.% solids, the quantity of binder being sufficient to coat substantially all of the filler particles and to form a plastic mixture with the filler; and (iii) less than about 2 parts by weight of the oxides or hydroxides of magnesium, calcium, chromium and manganese;
(b) applying the mortar mix to form a seam between a pair of opposed refractory bricks, said seam and bricks comprising, in combination, a refractory assembly; and
(c) firing the refractory assembly at an elevated temperature of about 700° to 800° C.

15. The method of claim 14 wherein said binder comprises an aqueous suspension of silica.

16. The method of claim 15 wherein said filler comprises silicon oxynitride or silicon aluminum oxynitride wherein the aluminum and oxygen are in a solid solution of silicon nitride.

17. The method of claim 16 wherein said mix further comprises:
(iv) about 0.1 to 25 parts by weight of fumed silica.

* * * * *